(12) United States Patent
Levy et al.

(10) Patent No.: US 8,084,171 B2
(45) Date of Patent: Dec. 27, 2011

(54) UNDERCOAT COMPOSITION

(75) Inventors: Daniel Levy, Rochester, NY (US); Jin Wu, Webster, NY (US); Liang-bih Lin, Rochester, NY (US); Francisco Lopez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1310 days.

(21) Appl. No.: 11/361,360

(22) Filed: Feb. 24, 2006

(65) Prior Publication Data
US 2007/0202422 A1    Aug. 30, 2007

(51) Int. Cl.
*G03G 5/14* (2006.01)
(52) U.S. Cl. .................. 430/60; 524/367; 524/430
(58) Field of Classification Search .......... 524/367, 524/430; 430/60
See application file for complete search history.

(56) References Cited

U.S. PATENT DOCUMENTS

| | | | |
|---|---|---|---|
| 3,931,026 A * | 1/1976 | Berkner ............... 524/423 |
| 4,265,990 A | 5/1981 | Stolka et al. |
| 4,921,769 A | 5/1990 | Yuh et al. |
| 5,958,638 A | 9/1999 | Katayama et al. |
| 6,132,912 A | 10/2000 | Fuller et al. |
| 6,156,468 A | 12/2000 | Wehelie et al. |
| 6,177,219 B1 | 1/2001 | Yuh et al. |
| 6,255,027 B1 | 7/2001 | Wehelie et al. |
| 6,287,737 B1 | 9/2001 | Ong et al. |
| 6,444,386 B1 | 9/2002 | Liu et al. |
| 2005/0168801 A1* | 8/2005 | O'Neil et al. .......... 359/321 |
| 2006/0029811 A1* | 2/2006 | Sugioka et al. .......... 428/413 |
| 2007/0048639 A1* | 3/2007 | Wu et al. .............. 430/60 |

FOREIGN PATENT DOCUMENTS

JP    46-7792    *    2/1971

OTHER PUBLICATIONS

English translation of the abstract of JP 46-7792 published Feb. 1971.*

* cited by examiner

*Primary Examiner* — Peter Vajda
(74) *Attorney, Agent, or Firm* — MH2 Technology Law Group LLP

(57) ABSTRACT

A binder containing a substituted fluorone can be utilized in an electrophotographic imaging member undercoat layer.

5 Claims, 1 Drawing Sheet

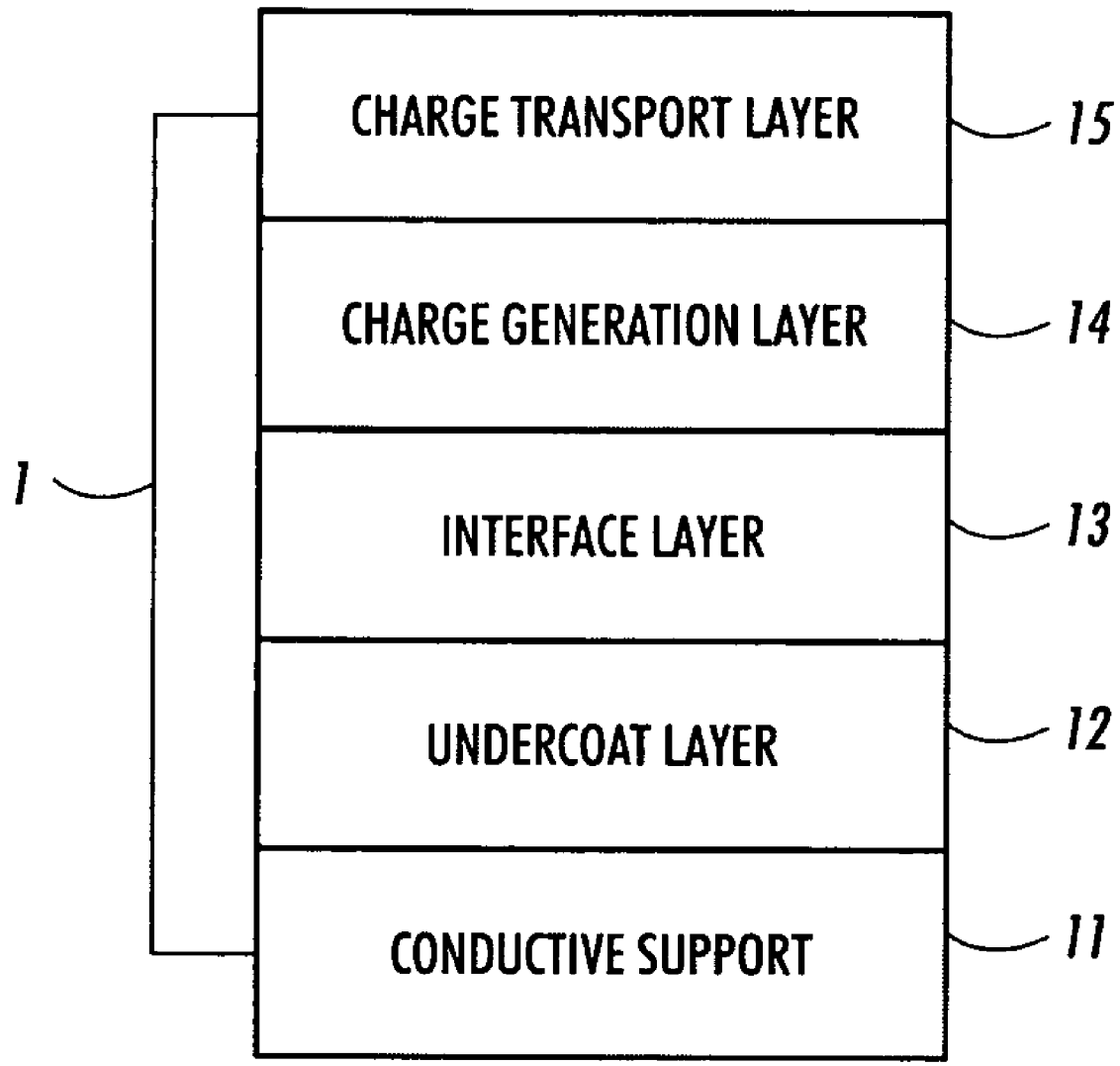

UNDERCOAT COMPOSITION

FIELD OF THE DISCLOSURE

This disclosure is generally directed to binders, and electrophotographic imaging members containing the binders. More particularly, this disclosure is generally directed to binders comprising a substituted fluorone and metal oxide particles, and electrophotographic imaging members comprising an undercoat comprising the disclosed binder.

BACKGROUND OF THE DISCLOSURE

In xerography, or electrophotographic printing/copying, an electrophotographic imaging member can be electrostatically charged. For optimal image production, the electrophotographic imaging member can be uniformly charged across its entire surface. The electrophotographic imaging member can then be exposed to a light pattern of an input image to selectively discharge the surface of the electrophotographic imaging member in accordance with the image. The resulting pattern of charged and discharged areas on the electrophotographic imaging member can form an electrostatic charge pattern (i.e., a latent image) conforming to the input image. The latent image can be developed by contacting it with finely divided electrostatically-attractable powder called toner. Toner can be held on the image areas by electrostatic force. The toner image can then be transferred to a substrate or support member, and the image can then be affixed to the substrate or support member by a fusing process to form a permanent image on the substrate or support member. After transfer, excess toner left on the electrophotographic imaging member can be cleaned from the surface, and residual charge can be erased from the electrophotographic imaging member.

Electrophotographic imaging members can be provided in a number of forms. For example, an electrophotographic imaging member can be a homogeneous layer of a single material, for example vitreous selenium, or it can be a composite layer containing an electrophotographic layer and another material. In addition, the electrophotographic imaging member can be layered.

Conventional layered electrophotographic imaging members can generally have at least a flexible substrate support layer and two active layers. These active layers can generally include a charge generation layer that can contain a light absorbing material, and a charge transport layer that can contain charge transport molecules. These layers can be in any order, and sometimes can be combined in a single or a mixed layer. The flexible substrate support layer can be formed of a conductive material. Alternatively, a conductive layer can be formed on top of a nonconductive flexible substrate support layer.

Conventional electrophotographic imaging members can be either a function-separation type photoreceptor, in which a layer containing a charge generation substance (charge generation layer) and a layer containing a charge transport substance (charge transport layer) can be separately provided, or a monolayer type photoreceptor in which both the charge generation layer and the charge transport layer can be contained in the same layer.

Conventional electrophotographic imaging members can have an undercoat layer interposed between the conductive support and the charge generation layer. Examples of conventional undercoat layers are disclosed in U.S. Pat. Nos. 4,265,990; 4,921,769; 5,958,638; 5,958,638; 6,132,912; 6,287,737; and 6,444,386; incorporated herein by reference in their entireties.

Thick undercoat layers can be desirable for electrophotographic imaging members because thick undercoat layers can provide longer life spans, can provide resistance to carbon fiber, and can permit the use of less expensive substrates. However, "ghosting" can be a problem when using thick undercoat layers.

In particular, when an image is formed on a photoreceptor, it can be the result of some areas being exposed and others not. The exposed areas can have a different surface potential than the areas that have not been exposed. In theory, once a section of the photoreceptor goes through the erase portion of the cycle, all portions of that section should have the same surface potential. This ensures that upon charging, the surface potential can be the same.

With ghosting, it is believed that the erase does not bring the surface potentials to the same value. Upon charging, the previously exposed and unexposed areas can have a different potential and even when they see the same amount of exposure with the next cycle, some areas can be darker or lighter than others. Those areas that can be lighter or darker can be the latent images from the previous cycles.

Negative ghosting refers to the latent image printing lighter than the surrounding areas, while positive ghosting refers to the latent image printing darker than the surrounding areas.

What is needed is a binder that can improve the ghosting properties and/or improve performance of thick undercoat layers and electrophotographic imaging members containing thick undercoat layers.

SUMMARY

In aspects, a binder can comprise a substituted fluorone and metal oxide particles.

In aspects, an electrophotographic imaging member can comprise: a support layer, one or both of a charge generation layer and a charge transport layer, and an undercoat layer comprising a binder comprising a substituted fluorone and metal oxide particles.

In aspects, a method of making a binder can comprise providing a substituted fluorone and metal oxide particles.

BRIEF DESCRIPTION OF THE DRAWING

FIG. 1 is a block diagram outlining the elements of an electrophotographic imaging member.

DETAILED DESCRIPTION

An electrographic, such as an electrostatographic or electrophotographic, imaging member can comprise an undercoat layer, wherein the undercoat layer can be of a thickness to provide a longer life span and provide resistance to carbon fibers. The undercoat layer can comprise a binder comprising a substituted fluorone and metal oxide particles.

Any substituted fluorone can be used in the binder of the present disclosure. In an aspect, the substituted fluorone can be represented by formula (I):

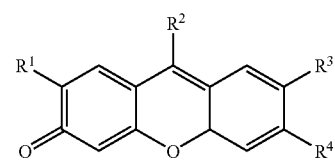

wherein $R^1$, $R^2$, $R^3$, and $R^4$ are each independently a hydrogen, a hydroxyl group, and a hydrocarbyl substitutent comprising from about 1 to about 40 carbon atoms. The substituted fluorone of formula (I) can comprise at least two hydroxyl groups. In an aspect, $R^2$ can be a phenyl group. In another aspect, $R^3$ and $R^4$ are both hydroxyl groups. In a further aspect, $R^1$ is a hydroxyl group. Non-limiting examples of substituted fluorones for use in the disclosed binder include rhodamine, eosin, erythrosine, fluorescein, Indian yellow, merchurochrome, and 9-phenyl-2,3,7-trihydroxy-6-fluorone. The substituted fluorone can be 9-phenyl-2,3,7-trihydroxy-6-fluorone.

The substituted fluorone can be present in the binder in any desired or effective amount. In an aspect, the substituted fluorone can be present in the binder in an amount of about 0.1% to about 10%, and for example about 0.5% to about 1% relative to the amount of titanium dioxide, based on weight.

The substituted fluorone can have at least two terminal hydroxyl groups in close proximity that can interact with the metal oxide particles to form a charge transfer complex.

The metal oxide particles for use in the disclosed binder can be nanoparticles. They can be selected from, for example, ZnO, $SnO_2$, $TiO_2$, $Al_2O_3$, $SiO_2$, $ZrO_2$, $In_2O_3$, $MoO_3$, and a complex oxide thereof. In various aspects, the metal oxide nanoparticles can have a powder volume resistivity varying from about $10^4$ to about $10^{10}$ $\Omega cm^2$ at a 100 kg/cm² loading pressure, 50% humidity, and room temperature. In various aspects, the metal oxide nanoparticles can be $TiO_2$. Non-limiting examples of $TiO_2$ nanoparticles include STR-60N (no surface treatment and powder volume resisitivity of approximately $9 \times 10^5$ $\Omega cm$) (available from Sakai Chemical Industry Co., Ltd.), FTL-100 (no surface treatment and powder volume resistivity of approximately $3 \times 10^5$ $\Omega cm$) (available from Ishihara Sangyo Laisha, Ltd.), STR-60 ($Al_2O_3$ coated and powder volume resisitivity of approximately $4 \times 10^6$ $\Omega cm$) (available from Sakai Chemical Industry Co., Ltd.), TTO-55N (no surface treatment and powder volume resisitivity of approximately $5 \times 10^5$ $\Omega cm$) (available from Ishihara Sangyo Laisha, Ltd.), TTO-55A ($Al_2O_3$ coated and powder volume resisitivity of approximately $4 \times 10^7$ $\Omega cm$) (available from Ishihara Sangyo Laisha, Ltd.), MT-150W (sodium metaphosphated coated and powder volume resistivity of approximately $4 \times 10^4$ $\Omega cm$) (available from Tayca), and MT-150AW (no surface treatment and powder volume resistivity of approximately $1 \times 10^5$ $\Omega cm$) (available from Tayca).

The metal oxide particles can be present in the binder in any desired or effective amount. For example, the metal oxide particles can be present in an amount ranging from about 50 to about 70%, and for example from about 60 to about 63% by weight on a solids basis.

The binder disclosed herein can also optionally comprise a co-resin comprising a phenolic resin and an aminoplast resin.

As used herein, phenolic resins are condensation products of an aldehyde with a phenol source in the presence of an acidic or basic catalyst.

The phenol source can be, for example, phenol, alkyl-substituted phenols such as cresols and xylenols, halogen-substituted phenols such as chlorophenol, polyhydric phenols such as resorcinol or pyrocatechol, polycyclic phenols such as naphthol and bisphenol A, aryl-substituted phenols, cycloalkyl-substituted phenols, aryloxy-substituted phenols, and combinations thereof. In various aspects, the phenol source can be phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, multiple ring phenols such as bisphenol A, and combinations thereof.

The aldehyde for use in making the phenolic resin can be, for example, formaldehyde, paraformaldehyde, acetaldehyde, butyraldehyde, paraldehyde, glyoxal, furfuraldehyde, propinonaldehyde, benzaldehyde, and combinations thereof. In various aspects, the aldehyde can be formaldehyde.

Non-limiting examples of a phenolic resin include dicyclopentadiene type phenolic resins, phenol novolak resins, cresol novolak resins, phenol aralkyl resins, and combinations thereof. U.S. Pat. Nos. 6,255,027, 6,177,219, and 6,156,468, incorporated herein by reference in their entireties, disclose examples of photoreceptors containing a hole blocking layer of a plurality of light scattering particles dispersed in a binder. For example, see Example I of U.S. Pat. No. 6,156,468, which discloses a hole blocking layer of titanium dioxide dispersed in a specific linear phenolic binder of VARCUM™ (available from OxyChem Company). Examples of phenolic resins include, but are not limited to, formaldehyde polymers with phenol, p-tert-butylphenol, and cresol, such as VARCUM™ 29159 and 29101 (OxyChem Co.) and DURITE™ 97 (Borden Chemical), or formaldehyde polymers with ammonia, cresol, and phenol, such as VARCUM™ 29112 (OxyChem Co.), or formaldehyde polymers with 4,4'-(1-methylethylidene) bisphenol such as VARCUM™ 29108 and 29116 (OxyChem Co.), or formaldehyde polymers with cresol and phenol such as VARCUM™ 29457 (OxyChem Co.), DURITE™ SD-423A, SD-422A (Borden Chemical), or formaldehyde polymers with phenol and p-tert-butylphenol such as DURITE™ ESD 556C (Border Chemical).

In aspects, the phenolic resins can be used as-is, or they can be modified to enhance certain properties. For example, the phenolic resins can be modified with suitable plasticizers, e.g. including but not limited to polyvinyl butyral, polyvinyl formal, alkyds, epoxy resins, phenoxy resins (bisphenol A, epichlorohydrin polymer) polyamides, oils, and the like.

The aminoplast resin for use in the co-resin can be a melamine-formaldehyde resin, a urea-formaldehyde resin, a benzoguanamine-formaldehyde resin, a glycoluril-formaldehyde resin, and/or mixtures thereof.

As used herein, aminoplast resin refers to a type of amino resin made from nitrogen-containing substance and formaldehyde, wherein the nitrogen-containing substance includes melamine, urea, benzoguanamine and glycoluril. Also as used herein, melamine resins are amino resins made from melamine and formaldehyde. Melamine resins are known under various trade names, including but not limited to CYMEL™, BEETLE™, DYNOMIN™, BECKAMINE™, UFR™, BAKELITE™, ISOMIN™, MELAICAR™, MELBRITE™, MELMEX™, MELOPAS™, RESART™, and ULTRAPAS™. As used herein, urea resins are amino resins made from urea and formaldehyde. Urea resins are known under various trade names, including but not limited to CYMEL™, BEETLE™, UFRM, DYNOMIN™, BECKAMINE™, and AMIREME™. As used herein, benzoguanamine resins are amino resins made from benzoguanamine and formaldehyde. Benzoguanamine resins are known under various trade names, including but not limited to CYMEL™, BEETLE™, and UFORMITE™. As used herein, glycoluril resins are amino resins made from glycoluril and formaldehyde. Glycoluril resins are known under various trade names, including but not limited to CYMEL™, and POWDERLINK™. The aminoplast resins can be highly alkylated or partially alkylated.

In aspects, the melamine resin can have a generic formula of

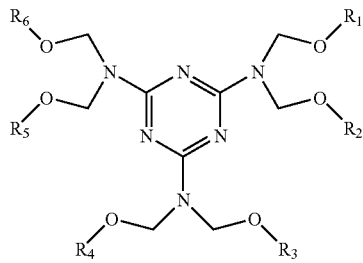

in which $R_1$, $R_2$, $R_3$, $R_4$, $R_5$ and $R_6$ each independently represents a hydrogen atom or an alkyl chain with 1 to 8 carbon atoms, or with 1 to 4 carbon atoms.

the melamine resin can be water-soluble, dispersible or indispersible. In various aspects, the melamine resin can be highly alkylated/alkoxylated, partially alkylated/alkoxylated, or mixed alkylated/alkoxylated. In various aspects, the melamine resin can be methylated, n-butylated or isobutylated. Non-limiting examples of the melamine resin can include highly methylated melamine resins such as CYMEL™ 350, 9370; methylated high imino melamine resins (partially methylolated and highly alkylated) such as CYMEL™ 323, 327; partially methylated melamine resins (highly methylolated and partially methylated) such as CYMEL™ 373, 370; high solids mixed ether melamine resins such as CYMEL™ 1130, 324; n-butylated melamine resins such as CYMEL™ 1151, 615; n-butylated high imino melamine resins such as CYMEL™ 1158; iso-butylated melamine resins such as CYMEL™ 255-10. CYMEL™ melamine resins are commercially available from CYTEC.

In aspects, the melamine resin can be selected from methylated formaldehyde-melamine resin, methoxymethylated melamine resin, ethoxymethylated melamine resin, propoxymethylated melamine resin, butoxymethylated melamine resin, hexamethylol melamine resin, alkoxyalkylated melamine resins such as methoxymethylated melamine resin, ethoxymethylated melamine resin, propoxymethylated melamine resin, butoxymethylated melamine resin, and mixtures thereof.

In aspects, the urea resin can have a generic formula of

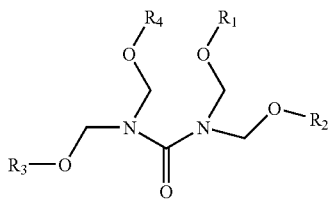

in which $R_1$, $R_2$, $R_3$, and $R_4$ each independently represents a hydrogen atom or an alkyl chain with 1 to 8 carbon atoms, or with 1 to 4 carbon atoms.

In aspects, the urea resin can be water-soluble, dispersible or indispersible. In various aspects, the urea resin can be highly alkylated/alkoxylated, partially alkylated/alkoxylated, or mixed alkylated/alkoxylated. In various aspects, the urea resin can be methylated, n-butylated or isobutylated. Non-limiting examples of the urea resin include methylated urea resins such as CYMEL™ U-65, U-382; n-butylated urea resins such as CYMEL™ U-1054, UB-30-B; iso-butylated urea resins such as CYMEL™ U-662, UI-19-I. CYMEL™ urea resins are commercially available from CYTEC.

In aspects, the benzoguanamine resin can have a generic formula of

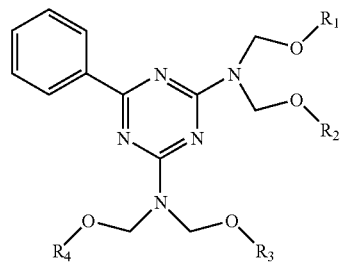

in which $R_1$, $R_2$, $R_3$, and $R_4$ each independently represents a hydrogen atom or an alkyl chain with 1 to 8 carbon atoms, or with 1 to 4 carbon atoms.

The benzoguanamine resin can be water-soluble, dispersible or indispersible. In various aspects, the benzoguanamine resin can be highly alkylated/alkoxylated, partially alkylated/alkoxylated, or mixed alkylated/alkoxylated. In various aspects, the benzoguanamine resin can be methylated, n-butylated or isobutylated. Non-limiting examples of the benzoguanamine resin include CYMEL™ 659, 5010, 5011. CYMEL™ benzoguanamine resins are commercially available from CYTEC.

The glycoluril resin can have a generic formula of

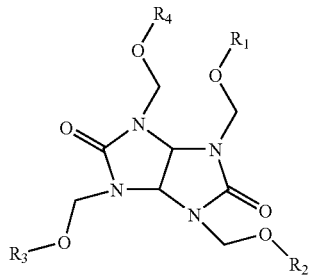

in which $R_1$, $R_2$, $R_3$, and $R_4$ each independently represents a hydrogen atom or an alkyl chain with 1 to 8 carbon atoms, or with 1 to 4 carbon atoms.

The glycoluril resin can be water-soluble, dispersible or indispersible. In various aspects, the glycoluril resin can be highly alkylated/alkoxylated, partially alkylated/alkoxylated, or mixed alkylated/alkoxylated. In various aspects, the glycoluril resin can be methylated, n-butylated or isobutylated. Non-limiting examples of the glycoluril resin include CYMEL™ 1170, 1171. CYMEL™ glycoluril resins are commercially available from CYTEC.

In aspects, a ratio of the phenolic resin to the aminoplast resin in the co-resin can be about 1/99 to about 99/1, for example about 20/80 to about 80/20, and as a further example about 30/70 to about 70/30.

The disclosed binder can also optionally contain an acid catalyst. In various aspects, the acid catalyst can be a para-toluene sulfonic acid. In various aspects, the acid catalyst can be CYCAT™ 4040 commercially available from CYTEC. In various aspects, the acid catalyst can be an amine neutralized para-toluene sulfonic acid. In various aspects, the acid catalyst can be NACURE™ 2107 commercially available from King Industries. In various aspects, the acid catalyst can be an amine neutralized phenyl acid phosphate. In various aspects, the acid catalyst can be NACURE™ 4575 commercially available from King Industries. In various aspects, the acid catalyst can be an amine neutralized dinonylnaphthalenedisulfonic acid. In various aspects, the acid catalyst can be NACURE™ 3525 commercially available from King Industries. In various aspects, the acid catalyst can be used to cure the phenolic/aminoplast co-resin. In various aspects, the phenolic/aminoplast co-resin can be cured at temperatures from about 120° C. to about 195° C., for example from about 145° C. to about 160° C. for a period of from about 10 minutes to about 60 minutes, and for example from about 20 minutes to about 45 minutes. In various aspects, the phenolic/aminoplast co-resin can be cured at 160° C. for 15 minutes. In aspects, the acid catalyst can be present in an amount of from about 0% to about 1%, or from about 0.1% to about 0.4% by weight of a total weight of the electrophotographic imaging member binder.

Moreover, the disclosed binder can also optionally contain a light scattering particle. In various aspects, the light scattering particle can have a refractive index different from the binder and can have a number average particle size greater than about 0.8 µm. Examples of the light scattering particle include, but are not limited to, inorganic materials such as amorphous silica, silicone ball, and minerals. Typical minerals include, for example, metal oxides, silicates, carbonates, sulfates, iodites, hydroxides, chlorides, fluorides, phosphates, chromates, clay, sulfur and the like. In various aspects, the light scattering particle can be amorphous silica P-100, commercially available from Espirit Chemical Co. In various aspects, the light scattering particle can be present in an amount of from about 0% to about 10%, or from about 2% to about 5% by weight of a total weight of the electrophotographic imaging member binder.

The Figure is a cross sectional view schematically showing an embodiment of an electrophotographic imaging member. The electrophotographic imaging member 1 shown in the Figure contains a separate charge generation layer 14 and charge transport layer 15. In the embodiment illustrated in the Figure, an undercoat layer 12 and an optional interface layer 13 are included in the electrophotographic imaging member 1. In aspects, the undercoat layer 12 can be interposed between the charge generation layer 14 and the conductive support 11. In aspects, the interface layer can be interposed between the undercoat layer 12 and the charge generation layer 14. In aspects, the undercoat layer can be located between the conductive support and the charge generation layer, without any intervening layers. In various aspects, additional layers, such as an interface layer or an adhesive layer, can be present and located between the undercoat layer and the charge generation layer, and/or between the conductive support and the undercoat layer.

In aspects, the conductive support 11 can include, for example, a metal plate, a metal drum or a metal belt using a metal such as aluminum, copper, zinc, stainless steel, chromium, nickel, molybdenum, vanadium, indium, gold or a platinum, or an alloy thereof; and paper or a plastic film or belt coated, deposited or laminated with a conductive polymer, a conductive compound such as indium oxide, a metal such as aluminum, palladium or gold, or an alloy thereof. Further, surface treatment such as anodic oxidation coating, hot water oxidation, chemical treatment, coloring or diffused reflection treatment such as graining can also be applied to a surface of the support 11.

The undercoat layer 12 can comprise a binder as disclosed above. Moreover, the undercoat layer 12 can also optionally contain one or more conventional binders. Examples of conventional binders include, but are not limited to, polyamides, vinyl chlorides, vinyl acetates, phenols, polyurethanes, melamines, benzoguanamines, polyimides, polyethylenes, polypropylenes, polycarbonates, polystyrenes, acrylics, methacrylics, vinylidene chlorides, polyvinyl acetals, epoxys, silicones, vinyl chloride-vinyl acetate copolymers, polyvinyl alcohols, polyesters, polyvinyl butyrals, nitrocelluloses, ethyl celluloses, caseins, gelatins, polyglutamic acids, starches, starch acetates, amino starches, polyacrylic acids, polyacrylamides, zirconium chelate compounds, titanyl chelate compounds, titanyl alkoxide compounds, organic titanyl compounds, silane coupling agents, and combinations thereof.

Further, the undercoat layer 12 can also optionally contain various colorants. Non-limiting examples of colorants include organic pigments and organic dyes, including, but not limited to, azo pigments, quinoline pigments, perylene pigments, indigo pigments, thioindigo pigments, bisbenzimidazole pigments, phthalocyanine pigments, quinacridone pigments, quinoline pigments, lake pigments, azo lake pigments, anthraquinone pigments, oxazine pigments, dioxazine pigments, triphenylmethane pigments, azulenium dyes, squalium dyes, pyrylium dyes, triallylmethane dyes, xanthene dyes, thiazine dyes, and cyanine dyes. In various aspects, the undercoat layer 12 can include inorganic materials, such as amorphous silicon, amorphous selenium, tellurium, a selenium-tellurium alloy, cadmium sulfide, antimony sulfide, titanium oxide, tin oxide, zinc oxide, and zinc sulfide, and combinations thereof.

In aspects, the undercoat layer 12 can be formed between the electroconductive support and the charge generation layer. The undercoat layer can be effective for blocking leakage of charge from the electroconductive support to the charge generation layer and/or for improving the adhesion between the electroconductive support and the charge generation layer. In aspects, one or more additional layers can exist between the undercoat layer 12 and the charge generation layer.

The undercoat layer 12 can be coated onto the conductive support 11 from a suitable solvent. Suitable solvents can include, but are not limited to, xylene/1-butanol/MEK, N,N-dimethyl formamide, N,N-dimethyl acetamide, dimethyl sulfoxide, tetrahydrofuran, dichloromethane, xylene, toluene, methanol, ethanol, 1-butanol, isobutanol, methyl ethyl ketone, methyl isobutyl ketone, and mixtures thereof.

The undercoat layer 12 can be coated onto the conductive substrate 11 using various coating methods. Suitable coating methods can include, but are not limited to, blade coating, wire bar coating, spray coating, dip coating, bead coating, air knife coating or curtain coating can be employed.

In aspects, the thickness of the undercoat layer 12 can be from about 0.1 µm to 30 µm, for example from about 2 µm to 25 µm, and as a further example from about 10 µm to 20 µm. In aspects, electrophotographic imaging members can contain undercoat layers having a thickness as described above.

In aspects, the electrophotographic imaging member 1 can optionally include an interface layer 13. In various aspects, the interface layer 13 can contain one or more conventional components. Examples of conventional components can include, but are not limited to, polyesters, polyamides, poly(vinyl butyral), poly(vinyl alcohol), polyurethane and polyacrylonitrile. In various aspects, the interface layer can also contain conductive and nonconductive particles, such as zinc oxide, titanium dioxide, silicon nitride, carbon black, and the like.

In aspects, the interface layer 13 can be coated onto a substrate using various coating methods. Suitable coating methods can include, but are not limited to, blade coating, wire bar coating, spray coating, dip coating, bead coating, air knife coating or curtain coating can be employed. In aspects, the thickness of the interface layer can be from about 0.001 μm to about 5 μm, for example about 1 μm, and as a further example about 0.5 μm.

The charge generation layer 14 can be formed by applying a coating solution containing the charge generation substance(s) and a binding resin, and further fine particles, an additive, and other components.

Binding resins used in the charge generation layer 14 can include polyvinyl acetal resins, polyvinyl formal resins or a partially acetalized polyvinyl acetal resins in which butyral can be partially modified with formal or acetoacetal, polyamide resins, polyester resins, modified ether-type polyester resins, polycarbonate resins, acrylic resins, polyvinyl chloride resins, polyvinylidene chlorides, polystyrene resins, polyvinyl acetate resins, vinyl chloride-vinyl acetate copolymers, silicone resins, phenol resins, phenoxy resins, melamine resins, benzoguanamine resins, urea resins, polyurethane resins, poly-N-vinylcarbazole resins, polyvinylanthracene resins and polyvinylpyrene resins. These resins can be used either alone or as a combination of two or more such resins.

The solvents used in preparing the charge generation layer coating solution can include organic solvents such as methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride and chloroform, mixtures of two or more of thereof, and the like.

The charge generation layer 14 can include various charge generation substances, that can include, but are not limited to, various organic pigments and organic dyes such as an azo pigment, a quinoline pigment, a perylene pigment, an indigo pigment, a thioindigo pigment, a bisbenzimidazole pigment, a phthalocyanine pigment, a quinacridone pigment, a quinoline pigment, a lake pigment, an azo lake pigment, an anthraquinone pigment, an oxazine pigment, a dioxazine pigment, a triphenylmethane pigment, an azulenium dye, a squalium dye, a pyrylium dye, a triallylmethane dye, a xanthene dye, a thiazine dye and cyanine dye; and inorganic materials such as amorphous silicon, amorphous selenium, tellurium, a selenium-tellurium alloy, cadmium sulfide, antimony sulfide, zinc oxide and zinc sulfide. The charge generation substances can be used either alone or in a combination of two or more such substances. In aspects, the ratio of the charge generation substance to the binding resin can be within the range of 5:1 to 1:2 by volume.

The charge generation layer 14 can be formed by various forming methods, that can include but is not limited to, dip coating, roll coating, spray coating, rotary atomizers, and the like. In various aspects, the charge generation layer 14 can be formed by the vacuum deposition of the charge generation substance(s), or by the application of a coating solution in which the charge generation substance can be dispersed in an organic solvent containing a binding resin. In aspects, the deposited coating can be effected by various drying methods, that can include, but is not limited to, oven drying, infra-red radiation drying, air drying and the like.

A stabilizer such as an antioxidant or an inactivating agent can be added to the charge generation layer 14. The antioxidants can include, for example, antioxidants such as phenolic, sulfur, phosphorus and amine compounds. The inactivating agents can include bis(dithiobenzyl)nickel and nickel di-n-butylthiocarbamate. The charge transport layer 14 can further contain an additive such as a plasticizer, a surface modifier, and an agent for preventing deterioration by light.

The charge transport layer 15 can be formed by applying a coating solution containing the charge transport substance(s) and a binding resin, and further fine particles, an additive, and other components.

Binding resins used in the charge transport layer 15 can be high molecular weight polymers that can form an electrical insulating film. Examples of these binding resins can include, but are not limited to, polyvinyl acetal resins, polyamide resins, cellulose resins, phenol resins, polycarbonates, polyesters, methacrylic resins, acrylic resins, polyvinyl chlorides, polyvinylidene chlorides, polystyrenes, polyvinyl acetates, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazoles, polyvinyl butyrals, polyvinyl formals, polysulfones, caseins, gelatins, polyvinyl alcohols, phenol resins, polyamides, carboxymethyl celluloses, vinylidene chloride-based polymer latexes, and polyurethanes.

The charge transport layer 15 can include various activating compounds that, as an additive dispersed in electrically inactive polymeric materials, makes these materials electrically active. These compounds can be added to polymeric materials which can be incapable of supporting the injection of photogenerated holes from the charge generation material and incapable of allowing the transport of these holes therethrough. This can convert the electrically inactive polymeric material to a material that can be capable of supporting the injection of photogenerated holes from the charge generation material and can be capable of allowing the transport of these holes through the active layer in order to discharge the surface charge on the active layer. In aspects, the charge transport layer 15 can be from about 25 percent to about 75 percent by weight of at least one charge transporting aromatic amine compound, and about 75 percent to about 25 percent by weight of a polymeric film forming resin in which the aromatic amine can be soluble.

Low molecular weight charge transport substances can include, but are not limited to, pyrenes, carbazoles, hydrazones, oxazoles, oxadiazoles, pyrazolines, arylamines, arylmethanes, benzidines, thiazoles, stilbenes, and butadiene compounds. Further, high molecular weight charge transport substances can include, but are not limited to, poly-N-vinylcarbazoles, poly-N-vinylcarbazole halides, polyvinyl pyrenes, polyvinylanthracenes, polyvinylacridines, pyreneformaldehyde resins, ethylcarbazole-formaldehyde resins, triphenylmethane polymers, and polysilanes.

The charge transport layer 15 can contain an additive such as a plasticizer, a surface modifier, an antioxidant or an agent for preventing deterioration by light.

In aspects, the charge transport layer 15 can be mixed and applied to a coated or uncoated substrate by various methods that can include, but are not limited to, spraying, dip coating, roll coating, wire wound rod coating, and the like. In aspects, the charge transport layer 15 can be dried by various drying methods that can include, but are not limited to, oven drying, infra-red radiation drying, air drying and the like.

An overcoat layer can be applied to improve resistance to abrasion. The overcoat layer can contain a resin, a silicon compound and metal oxide nanoparticles. The overcoat layer can further contain a lubricant or fine particles of a silicone oil or a fluorine material, which can also improve lubricity and strength. In aspects, the thickness of the overcoat layer can be from 0.1 to 10 μm, for example from 0.5 to 7 μm, and as a further example from 1.5 to 3.5 μm.

An anti-curl back coating can be applied to provide flatness and/or abrasion resistance where a web configuration photoreceptor can be fabricated. A non-limiting example of an anti-curl backing layer is described in U.S. Pat. No. 4,654,284, incorporated herein by reference in its entirety.

In aspects, an image forming apparatus that can contain a non-contact charging unit (e.g., a corotron charger) or a contact charging unit, an exposure unit, a developing unit, a transfer unit and a cleaning unit, can be arranged along the rotational direction of an electrophotographic imaging member. In aspects, the image forming apparatus can be equipped with an image fixing device, and a medium to which a toner image can be transferred can be conveyed to the image fixing device through the transfer device.

In aspects, the contact charging unit can have a roller-shaped contact charging member. The contact charging unit can be arranged so that it comes into contact with a surface of the electrophotographic imaging member, and a voltage can be applied, thereby being able to give a specified potential to the surface of the electrophotographic imaging member. As a material for such a contact charging member, there can be used a metal such as aluminum, iron or copper, a conductive polymer material such as a polyacetylene, a polypyrrole or a polythiophene, or a dispersion of fine particles of carbon black, copper iodide, silver iodide, zinc sulfide, silicon carbide, a metal oxide or the like in an elastomer material such as polyurethane rubber, silicone rubber, epichlorohydrin rubber, ethylene-propylene rubber, acrylic rubber, fluororubber, styrene-butadiene rubber or butadiene rubber. Non-limiting examples of the metal oxides include $ZnO$, $SnO_2$, $TiO_2$, $In_2O_3$, $MoO_3$ and a complex oxide thereof. Further, a perchlorate can be added to the elastomer material to impart conductivity.

A covering layer can also be provided on a surface of the contact charging unit. Materials for forming this covering layer can include N-alkoxymethylated nylon, a cellulose resin, a vinylpyridine resin, a phenol resin, a polyurethane, polyvinyl butyral and melamine, and these can be used either alone or in a combination of two or more. Furthermore, an emulsion resin material such as an acrylic resin emulsion, a polyester resin emulsion or a polyurethane, particularly an emulsion resin synthesized by soap-free emulsion polymerization can also be used. In order to further adjust resistivity, conductive agent particles can be dispersed in these resins, and in order to prevent deterioration, an antioxidant can also be added thereto. Further, in order to improve film forming properties in forming the covering layer, a leveling agent or a surfactant can also be added to the emulsion resin.

The resistance of the contact charging unit can be from $10^0$ to $10^{14}$ Ωcm, and for example from $10^2$ to $10^{12}$ Ωcm. When a voltage is applied to this contact charging unit, either a DC voltage or an AC voltage can be used as the applied voltage. Further, a superimposed voltage of a DC voltage and an AC voltage can also be used. Such a contact charging unit can be in the shape of a blade, a belt, a brush or the like.

The exposure unit can be an optical device which can perform desired image wise exposure to a surface of the electrophotographic imaging member with a light source such as a semiconductor laser, an LED (light emitting diode) or a liquid crystal shutter. In various aspects, the utilization of the exposure unit can make it possible to perform exposure to noninterference light.

The developing unit can be a known or later used developing unit utilizing a normal or reversal developing agent of a one-component system, a two-component system or the like.

There is no particular limitation on the shape of a toner used, and for example, an irregularly shaped toner obtained by pulverization or a spherical toner obtained chemical polymerization can be suitably used.

The transfer unit can be a contact type transfer charging device using a belt, a roller, a film, a rubber blade or the like, or a scorotron transfer charger or a corotron transfer charger utilizing corona discharge.

The cleaning unit can be a device for removing a remaining toner adhered to the surface of the electrophotographic imaging member after a transfer step, and the cleaned electrophotographic imaging member can be repeatedly subjected to the above-mentioned image formation process. The cleaning unit can be a cleaning blade, a cleaning brush, a cleaning roll or the like. In aspects, a cleaning blade is used. Materials for the cleaning blade can include urethane rubber, neoprene rubber and silicone rubber.

An intermediate transfer belt can be supported with a driving roll, a backup roll and a tension roll at a specified tension, and can be rotatable by the rotation of these rolls without the occurrence of deflection. Further, a secondary transfer roll can be arranged so that it can be brought into abutting contact with the backup roll through the intermediate transfer belt. The intermediate transfer belt which can have passed between the backup roll and the secondary transfer roll can be cleaned up by a cleaning blade, and then repeatedly subjected to the subsequent image formation process.

The disclosure should not be construed as being limited to the above-mentioned aspects. For example, in aspects, the image forming apparatus can be equipped with a process cartridge comprising the electrophotographic imaging member(s) and charging device(s). The utilization of such a process cartridge can allow maintenance to be performed more simply and easily.

Furthermore, in aspects, a toner image formed on the surface of the electrophotographic imaging member can be directly transferred to the medium. In various other aspects, the image forming apparatus can be provided with an intermediate transfer body. This can make it possible to transfer the toner image from the intermediate transfer body to the medium after the toner image on the surface of the electrophotographic imaging member has been transferred to the intermediate transfer body. In aspects, the intermediate transfer body can have a structure in which an elastic layer containing a rubber, an elastomer, a resin or the like and at least one covering layer are laminated on a conductive support.

In addition, in aspects, the disclosed image forming apparatus can be further equipped with a static eliminator such as an erase light irradiation device. This can prevent the incorporation of the residual potential of the electrophotographic imaging member into the subsequent cycle, when the electrophotographic imaging member can be repeatedly used.

Examples are set forth below and are illustrative aspects. It will be apparent to one skilled in the art that the aspects can be practiced with many types of compositions and can have many different uses in accordance with the disclosure above and as pointed out hereinafter.

EXAMPLES

Example 1

Binder Composition with a Substituted Fluorone 97.9 g of titanium dioxide $TiO_2$ MT-150W, Tayca Company (95%), was attritor milled in a binder system of 79.8 g VARCUM™ 29159 (50%), OxyChem Company, and 20.58 g CYMEL™ 323, CYTEC (82%) in 110 g xylene/n-butanol (50:50) using 900 g of 0.4 to 0.6 mm zirconium oxide beads. Milling for about 6½ hours resulted in a dispersion of 62% $TiO_2$ MT-150W, 26.6% VARCUM™ 29159, 11.4% CYMEL™ 323, which was then let down to 37% solids with 50:50 xylene/n-butanol and methyl ethyl ketone. CYCAT 4040 was added (0.2% relative to the weight of the total binders), followed by 9-phenyl-2,3,7-trihydroxy-6-fluorone (0.5% relative to weight of $TiO_2$). After rolling the dispersion for about 4 hours, the color changed from a yellow-orange to a reddish-orange.

Comparative Example 1

Binder Composition without a Substituted Fluorone

The composition of Example 1 was prepared except that 9-phenyl-2,3,7-trihydroxy-6-fluorone was not added.

The binder of Example 1 and the binder of Comparative Example 1 were coated at a thickness of 3 μm on a rough-lathed aluminum substrate (30 mm×404 mm) and dried at 160° C. for 40 minutes. This was followed by the coating of a charge generating layer (chlorogallium phthalocyanine pigment/VMCH @ 54:46 in n-butyl acetate) at a pullrate of 130 mm/min and a 29 um charge transport layer of mTBD/PCZ-400/PTFE/in a ratio of 43:57:8 in 70:30 THF/toluene. The charge transport layer was dried at 120° C. for 40 minutes.

Testing of the photoreceptors in an electrical scanner in an ambient laboratory environment showed comparable discharge and electrical characteristics.

The photoreceptors were then print tested in an environment of 70° F., and 10% humidity, a stress zone for ghosting. For example, they were then loaded and initially printed to give the t=0 print. The drums were then subjected to 200 effective print cycles and the $200^{th}$ print was collected (t=200). The prints were evaluated on a ghosting scale ranging from 0 to 5, with zero being absolutely no ghosting and 5 being poor ghosting performance. The composition comprising the substituted fluorone showed an improvement in ghosting relative to the composition that did not comprise the substituted fluorone. The data is shown in Table 1.

TABLE I

| (Jzone Platen Ghosting Test) | | |
|---|---|---|
| Composition | Ghosting (t = 0) | Ghosting (t = 200) |
| Comp. Ex. 1 | 3 | 6 |
| Ex. 1 | 3 | 5 |

Example 2

Binder Composition

Prior to milling, 44.2 kg of $TiO_2$ MT-150W (95%), 22.4 kg of VARCUM™ 29159 (50%), 20.5 kg of CYMEL™ 323 (82% in isobutanol), and 52.9 kg of xylene/n-butanol (50:50) were mixed overnight. The milling was started the next day and proceeded for 82 hours until the surface area of the titanium oxide measured 28.4 m²/g. The resulting dispersion (60:16:24 $TiO_2$ MT-150W/VARCUM™ 29159/CYMEL™ 323 in 48:48:4 xylene/n-butanol/isobutanol) was offloaded and let down to 40% solids. It was later let down to 38% solids, at which point, 137 mg of 9-phenyl-2,3,7-trihydroxy-6-fluorone was doped into 30 g of the dispersion as described above. The color change was consistent with before and the dispersion was filtered and coated.

Comparative Example 2

Binder Composition without a Substituted Fluorone

The composition of Example 2 was prepared except that 9-phenyl-2,3,7-trihydroxy-6-fluorone was not added.

The binder compositions of Example 2 and Comparative Example 2 were coated at 4 um thickness on a rough-lathed aluminum substrate (30 mm×404 mm) and dried for 40 minutes at 150° C. After cooling, a charge generating layer (same as above) was coated at 130 mm/min pullrate, followed by a 29 um charge transport layer (same as above). The charge transport layer was dried at 115° C. for 40 minutes.

The drums were electrically scanned in B-zone (normal environment) and showed near identical performance. The drums were tested in A-zone (83° F., 85% humidity). After 200 prints in A-zone, a significant improvement in ghosting was observed (see Table II below). The ghosting was positive in nature.

TABLE II

| Composition | Platen Ghosting (t = 0) | TCG Ghosting (t = 0) | Platen Ghosting (t = 200) | TCG Ghosting (t = 200) |
|---|---|---|---|---|
| Comp. Ex. 2 | 0 | 0 | 3 | 1 |
| Ex. 2 | 1 | 0 | 1 | 1 |

It will be appreciated that various of the above-disclosed and other features and functions, or alternatives thereof, can be desirably combined into many other different systems or applications. Also, various presently unforeseen or unanticipated alternatives, modifications, variations or improvements therein can be subsequently made by those skilled in the art, and are also intended to be encompassed by the following claims

What is claimed is:

1. An electrophotographic imaging member, comprising:
   a support layer,
   one or both of a charge generation layer and a charge transport layer, and
   an undercoat layer, comprising a binder comprising at least one co-resin selected from the group consisting of a phenolic resin, an aminoplast resin, and combinations thereof; and a complex comprising a substituted fluorone and metal oxide nanoparticles selected from the group consisting of ZnO, $TiO_2$, $SiO_2$, $ZrO_2$, $In_2O_3$, and a complex oxide thereof,
   wherein the substituted fluorone is represented by formula (I):

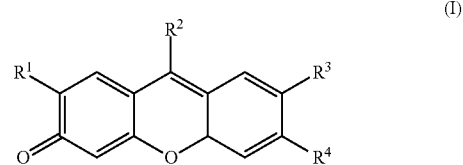

wherein $R^1$, $R^2$, $R^3$, and $R^4$ are each independently a hydrogen, a hydroxyl group, and a hydrocarbyl substitutent comprising from about 1 to about 40 carbon atoms, with the proviso that $R^2$ is a phenyl group, and
   wherein the substituted fluorone forms a complex with the metal oxide particles.

2. The electrophotographic imaging member of claim 1, wherein the metal oxide particles are titanium dioxide particles.

3. The electrophotographic imaging member of claim 2, wherein the substituted fluorone is present in the binder in an amount of from about 0.1% to about 10% relative to the titanium dioxide, based on weight.

4. The electrophotographic imaging member of claim 3, wherein the substituted fluorone is present in the binder in an amount of from about 0.5% to about 1% relative to the titanium dioxide, based on weight.

5. The electrophotographic imaging member of claim 1, wherein two of $R_1$, $R_3$ and $R_4$ are hydroxyl groups.

* * * * *